Oct. 4, 1966  L. A. WILLIAMS  3,276,988
ELECTROLYTIC REMOVAL OF WORK MATERIAL
Filed Oct. 6, 1959
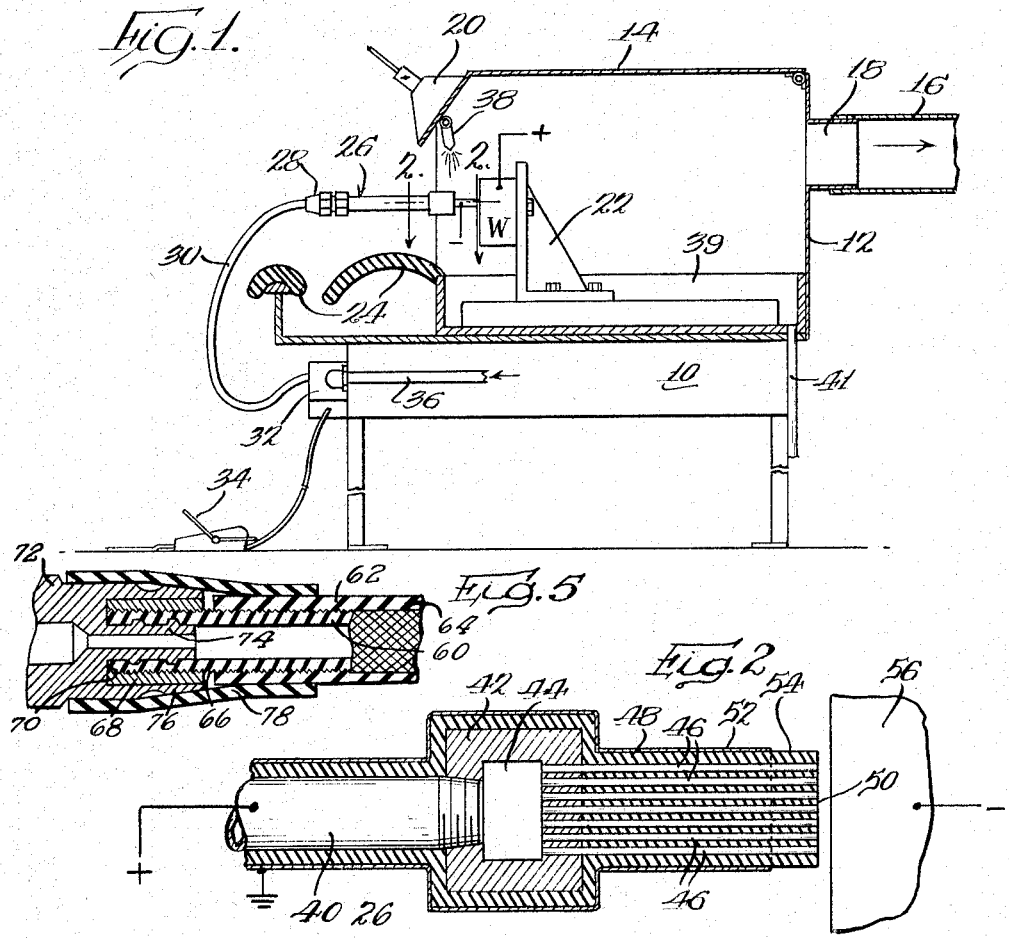
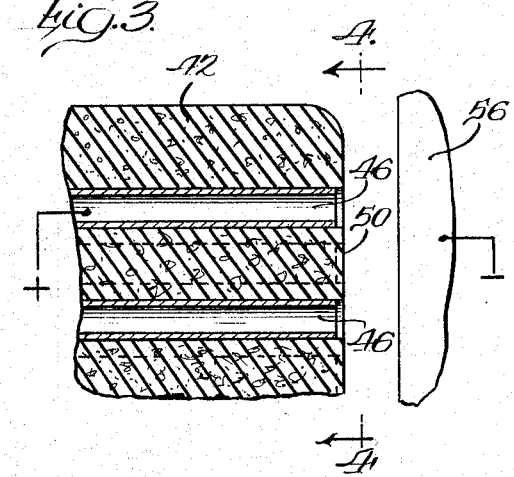
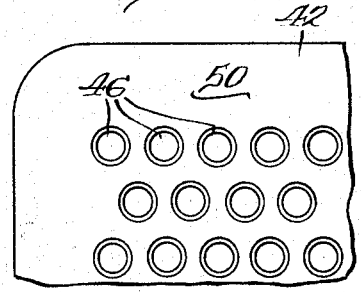
INVENTOR.
Lynn A. Williams
BY
Wupper, Gradolph & Love
Attys.

United States Patent Office 3,276,988
Patented Oct. 4, 1966

3,276,988
ELECTROLYTIC REMOVAL OF WORK MATERIAL
Lynn A. Williams, Winnetka, Ill., assignor to Anocut Engineering Company, Chicago, Ill., a corporation of Illinois
Filed Oct. 6, 1959, Ser. No. 844,706
1 Claim. (Cl. 204—284)

This invention relates to the removal of work material by electrolytic action and may, to some extent at least, be considered as an extension of the process set forth in my copending application Serial No. 772,960, filed Nov. 10, 1958, for Electrolytic Shaping, issued as Patent No. 3,058,895, dated Oct. 16, 1962.

It is well known that metal and metalloid materials may be eroded by electrolytic attack in a configuration where the workpiece is the anode in an electrolytic cell. As is explained in the above referred to application, it is of considerable advantage in such processes to use an electrolyzing current of high density with the spacing between the work and the electrode being held to a practical minimum. This close spacing may be accomplished in a machine in which the workpiece, and the tool which forms the electrode, are both held in such manner that the tool may be fed toward and into the workpiece by some precise slow moving means.

One of the objects of the present invention is to provide novel equipment for the electrolytic removal of work material which is so constituted that the electrode may be hand held without danger of the working end of the electrode engaging the work so as to produce arcing and which, in addition, insures that the distance between the electrode and the workpiece will be maintained at a constant practical minimum.

An additional object is to provide a novel tool electrode which is adapted to be hand held and which can be moved about by an operator to smooth a rough or patterned surface or to shape a cavity or the like in an efficient manner and without danger of injuring the electrode or the work by shorting the electrode against the work.

A further object is to provide a novel hand held electrode for the above purposes which provides adequate electrode area and a convenient and efficient means for supplying electrolyte to the interface regardless of electrode size, and which also has a convenient means for making the necessary electrical connections.

Yet another object is to provide a novel hand held electrode adapted for the electrolytic removal of work material which prevents the possiblity of the operator receiving an electric shock from leaking current.

Still another object is to provide an electrode embodying the above characteristics, which is well adapted for the production of a high surface finish upon the work.

Other objects and advantages will become apparent from the following description of a preferred embodiment of my invention which is illustrated in the accompanying drawings.

In the drawings, in which similar characters of reference refer to similar parts throughout the several views:

FIG. 1 is a diagrammatic representation in vertical longitudinal section of suitable mechanism forming a work station incorporating features of the present invention;

FIG. 2 is a medial longitudinal section through an electrolyzing tool embodying the features of the present invention. This view may be considered as taken in the direction of the arrows along the line 2—2 of FIG. 1;

FIG. 3 is a fragmentary enlargement of the right-hand or working end of the electrode of FIG. 2, which reveals details of the construction;

FIG. 4 is an end view of approximately the portion of the electrode illustrated in FIG. 3, and is indicated as being taken in the direction of the arrows along the line 4—4 of FIG. 3; and FIG. 5 is a fractional longitudinal medial sectional view of a hose and hose fitting which form a portion of the apparatus of the present invention.

It will be appreciated that there are many situations in which it is desired to smooth a rough surface, or to conduct a shaping, surface blending, or engraving operation manually. There are, however, serious difficulties associated with the manual removal of work material in a controlled fashion by electrolytic action, and it is the principal purpose of the present invention to provide solutions for the problems which arise in such operations.

In common with electrolytic processes using machine held and positioned electrodes, there is the problem of achieving a maximum or at least a large effective electrode area together with a relatively uniform distribution of electric potential throughout the electrode, and a similar uniformity of distribution of the eletcrolyte. In addition to these considerations, there is the problem of bringing the electrode surface quite close to the surface of the workpiece, of the order of a very few thousandths of an inch, while at the same time preventing the possibility of direct electrical contact between the electrode and the work, since such shorting not only stops the electrolytic action but, more importantly, erodes the work and the electrode in an uncontrolled fashion.

In FIG. 1, I have diagrammatically shown suitable equipment comprising a work station for practicing my invention. A table structure, indicated generally by the numeral 10, is provided with a canopy 12 having a hinged top 14 so that it can be opened to give access to the interior thereof. Vapors and gas are removed from this canopy by way of an exhaust duct 16 connected to a canopy exhaust fitting 18. The front of the canopy has an opening and, at the top, may include an electric lighting fixture 20 for illuminating the interior. Within the canopy the table supports a work holder exemplified in the present instance by the fixture 22, to which the work W is secured, with the face to be worked upon facing the canopy opening. In front of the canopy structure the table supports a pair of padded arm rests 24 which enable the operator to support the weight of the tool with less effort, and in addition, they help steady the electrode so that it is less likely to move inadvertently.

The electrode is indicated at 26 and is connected by a fitting 28 to a hose 30 leading to a control valve 32 in some close-by but out-of-the-way position. This valve may be of the electrically actuated type and, as shown, control thereover is exercised by a foot switch 34 which, when depressed, opens the valve at 32 so as to permit electrolyte supplied under pressure from a pipe 36 to pass through the valve 32, hose 30, and electrode 26. One or more nozzles for supplying an air blast are indicated at 38. These nozzles are positioned so as to blow away the electrolyte as it issues from the electrode. As the electrolyte runs or is blown from the face of the workpiece, it is caught in a tray 39 and drains through a return pipe 41 to an electrolyte storage reservoir, from which it is resupplied by pumping apparatus (not shown) to the pipe 36.

The electrode, which is shown in greater detail in FIG. 2, comprises a short length of electrolyte supply pipe 40 threaded into a box-like fitting 42 which provides a plenum chamber 44 from which the electrolyte is distributed to a multiplicity of small diameter generally parallel tubes 46 which project from the plenum chamber in a forwardly direction. These tubes preferably should be formed of material having good electrical conductivity, and each is anchored in the fitting 42 in some suitable manner as by brazing, for instance. All of the space within the tube mass is filled with an insulating material 48 which extends outwardly somewhat beyond the outermost tubes, so that the tube bundle is completely enclosed excepting at its extreme outer end 50. This insulating material, or a separate insulating jacket, also preferably encloses the fitting 42 and extends backwardly along the supply pipe 40 so as to form a handle for the operator.

Although other materials will suggest themselves, I have found that an easily moldable and otherwise suitable insulating material is an epoxy resin containing a considerable quantity of finely ground aluminum oxide or other hard nonconductive substance. The aluminum oxide is incorporated in the mix principally for the purpose of contributing a high order of wear resistance to the working face of the electrode.

The electrode, and perhaps a portion of the handle, are preferably enclosed in a thin metal sheath 52 which covers the entire external surface of the electrode excepting for a narrow zone 54 at the working end of the tool. This metal sheath may take any of several forms. It may comprise electrolytically deposited metal or sprayed melted metal, or wound bare wire with the turns preferably soldered together for example. The purpose of this metallic sheath will be discussed presently.

In any event, after the electrode has been prepared in the manner described, the working face 50 is ground flat or to a rounded or convex contour so as to provide a smooth face having a shape and size most convenient for the work to be accomplished. This grinding operation removes from the electrode end any tube unevenness and roughness of the insulating material resulting from the operation of molding the plastic material between and around the tubes 46. Furthermore, the end portions of any tubes that may have become plugged are removed so that all of the tubes 46 are capable of supplying electrolyte to the working face.

At the conclusion of the grinding step which shapes and smooths the electrode working face, the ends of the tubes 46 will be flush with the end face 50 of the insulating material. The working end of the tool is then brought close to a complementary surface upon a conductive forming tool 56, while electrolyte is being forced through the supply pipe 40 and tubes 46, the electrode and the forming tool being connected into an electrolyzing circuit in a sense such that the tool is the anode, as is shown in FIGS. 2 and 3. As the electrode tube ends reach close proximity to the forming tool they will be electrolytically attacked and eroded so that the tube ends begin to recede from the face of the electrode. Shortly thereafter the end of the electrode may be pressed against the forming tool 56 and the electrolytic action continues until the ends of the tubes 46 have receded from the face of the electrode by something of the order of a few thousandths of an inch. In any event, the amount of this tube end recession should be sufficient so as safely to prevent arcing between the ends of the tubes and a work surface engaging the working face of the electrode during subsequent use of the tool. It should not be made much greater than necessary, however, since unnecessary inefficiency is introduced with excessive electrode to workpiece spacing. The use of the epoxy resin for the insulating material insures that the working face 50 of the electrode is substantially nonresilient and therefore that the spacing beyond the ends of the conductive tubes 46 will be maintained.

Using the above outlined construction, a typical satisfactory tool electrode may be formed by using tubes of .065 diameter with a wall thickness of .015, with the tubes arranged in a rectangular pattern on .093 centers. Probably an even better arrangement, since it leads to closer tube spacing, is to use .035 stainless steel tubes with .018 bore, with the tubes spaced on about .050 centers with the rows of tubes staggered as is indicated in FIG. 4. It will be appreciated that these dimensions, which are given in inches, are not critical, but are supplied simply in the interest of definiteness concerning a practical arrangement.

Preferably the fitting at 28 is of the quick disconnect type and I prefer in the interest of convenience to supply the electrode with both electrolyte and the electrical connection through a single hose line. This may be accomplished in the manner indicated in FIG. 5. In this figure the hose 30 is shown as having a flexible liner 60 of synthetic rubber for instance. This liner is enclosed within a sheath 62 of braided metal wire which has the properties of being flexible, of supporting the internal hose pressure, and of being electrically conductive. Exteriorly of the braid 62 there is a second layer of pliable insulating material 64 having characteristics similar to those of the liner 60.

At each hose end, the covering 64 is stripped off a short section so as to expose the braid 62, as at 66. This exposed section is slid into a soft metal collar 68 and the end of the hose as thus prepared is pushed into an annular recess 70 at the end of a fitting 72 so that the liner 60 fits over a nipple 74 while the collar 68 is closely confined within a sleeve portion 76. The sleeve portion 76 is then radially compressed so as to imbed the braid 62 in the soft metal collar, thus forming a good mechanical hydraulic and electrical bond between the fitting 72 and the hose. After assembly, a length of soft rubber tubing 78 may be slid over the hose end and fitting to close the gap at the end of the stripped back covering 64.

The fitting at 76 may be considered as the hose portion of the quick disconnect 28 and also as the fitting at the other end of the line which is connected to the electrolyte valve 32. In use, the electrolyte is forced to the electrode through the hollow liner 60 while the electrolyzing circuit is connected to the tool by way of the metal braid 62.

It has been found that even though the electrolyzing circuit voltage is low—of the order of 10 volts—the operator may under some circumstances encounter a slight tingling sensation from leakage current if the electrode is simply insulated as by the material 48. This is because the end of the electrode and the operator's hand may become wet with electrolyte which, of course has relatively low electrical resistance.

The metallic sheath 52, which is connected to ground in any desired fashion, overcomes this effect by maintaining the operator's hand at ground potential. The current leakage between the ends of the tubes 46 and the sheath 52 is slight, and electrolytic erosion of the sheath takes place only very slowly. It is not necessary for the sheath 52 to extend all the way back over the insulated handle since a grounded barrier zone between the end of the electrode and the handle will prevent the electrode potential from influencing the potential of the insulated handle beyond the grounded barrier.

The system just described may be used as follows. The hood 14 is raised and a workpiece is secured to the work holder 22. The hood is then lowered and the operator holds the electrode or gun 26 with the end 50 against the work, using the arm rests 24 as seems most convenient. The foot switch 34 is then depressed. This turns on the electrolyzing current and opens the valve so as to supply electrolyte at a convenient pressure, of the order of 100 to 150 p.s.i. for instance. The electrode is then moved about as necessary, as work material is being removed to form the desired work contour and surface characteristic.

Preferably all during this operation, or at least after the final surface has been approximated, the tool should be kept in relatively constant motion in a generally random manner so as to prevent any unevenness of the electrolytic action from producing a surface pattern or other unevenness on the finished workpiece.

Because of the pressure of electrolyte, the face of the tool will be hydraulically held a short distance away from the surface of the workpiece. The tool therefore is easily slid about upon this thin film of electrolyte without there being direct engagement between the tool and the work material excepting perhaps when working over sharp edges or extremely uneven surfaces. Under all conditions, however, since the tube ends are spaced backwardly one or two thousandths of an inch or so from the face 50 of the insulating material, these tube ends cannot touch the workpiece and thus no care need be exercised in order to prevent shorting of the electrolyzing circuit.

At the conclusion of the operation, the foot switch 34 is shifted to the off position which acts to turn off both the electrolyte and the electrolyzing current. If during the operation the escaping electrolyte obscures the operator's vision, the air blast nozzles 38 are adjusted to blow the electrolyte away from the surface of the work so that it cannot accumulate.

The escaped electrolyte is caught in the pan 39 and returned by drain 41 to the reservoir from which it is resupplied to the line 36 by pumping apparatus which may be of the type described in the previously referred to copending application. As mentioned earlier, gases and vapors are exhausted from the canopy by way of the duct 16.

From the above description of a preferred embodiment of my invention it will be apparent that variations in any of the structures may be made without departing from the spirit and scope of the invention and that the scope of the invention is to be determined from the scope of the following claim.

Having described my invention, what I claim as new and useful and desire to secure by Letters Patent is:

In an electrode for the electrolytic removal of work material, means providing a block of insulating substance forming on a surface thereof a substantially nonresilient working face of the electrode adapted to be brought against a workpiece, an insulated handle secured to said block, a plurality of electrically conductive elements in said block defining a plurality of spaced passages through said block, said passages terminating at said working face, said elements extending to within about .002 inch of said working face to expose said conductive elements at said working face, means electrically connecting said elements together to facilitate their connection into an electrolyzing circuit, means connected to supply electrolyte to said passages at their ends remote from said working face for flow through said passages and discharge at said working face, and an electrically conductive covering for at least a portion of said block and said handle, said covering being insulated from said conductive elements and adapted to be grounded to act as a potential barrier against leakage current between the hands of an operator holding the handle and the exposed conductive elements at the working face.

References Cited by the Examiner

UNITED STATES PATENTS

| | | | |
|---|---|---|---|
| 1,416,929 | 5/1922 | Bailey | 204—224 |
| 1,809,826 | 6/1931 | Bohlman | 204—224 |
| 2,080,234 | 5/1937 | Schlotter | 204—224 |
| 2,146,924 | 2/1939 | Adey | 204—224 |
| 2,457,510 | 12/1948 | Van Ornum | 204—224 |
| 2,476,286 | 7/1949 | Cox | 204—224 |
| 2,848,401 | 8/1958 | Hartley | 204—143 |
| 2,905,605 | 9/1959 | Keeleric et al. | 204—143 |

FOREIGN PATENTS

| | | |
|---|---|---|
| 18,643 | 1899 | Great Britain. |
| 335,003 | 9/1930 | Great Britain. |
| 493,108 | 3/1938 | Great Britain. |

JOHN H. MACK, *Primary Examiner.*

H. FLOURNOY, D. R. JORDAN, *Assistant Examiners.*